United States Patent
Brumme et al.

(10) Patent No.: US 7,409,675 B2
(45) Date of Patent: Aug. 5, 2008

(54) CODE REWRITING

(75) Inventors: Christopher W. Brumme, Mercer Island, WA (US); Jan Gray, Bellevue, WA (US); Jonathan C. Hawkins, Seattle, WA (US); Alan C. Shi, Redmond, WA (US); Sean E. Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 10/789,201

(22) Filed: Feb. 27, 2004

(65) Prior Publication Data

US 2005/0193369 A1  Sep. 1, 2005

(51) Int. Cl.
*G06F 9/44* (2006.01)
(52) U.S. Cl. ............... 717/114; 717/126; 717/140; 717/154; 713/165
(58) Field of Classification Search ............. 717/114, 717/126, 140, 154; 713/165
See application file for complete search history.

(56) References Cited

U.S. PATENT DOCUMENTS

| 4,553,205 | A |  | 11/1985 | Porchia |  |
| 5,911,072 | A |  | 6/1999 | Simonyi |  |
| 6,070,007 | A |  | 5/2000 | Simonyi |  |
| 6,078,746 | A |  | 6/2000 | Simonyi |  |
| 6,097,888 | A |  | 8/2000 | Simonyi |  |
| 6,189,143 | B1 |  | 2/2001 | Simonyi |  |
| 6,219,834 | B1 |  | 4/2001 | Soroker et al. |  |
| 6,223,341 | B1 |  | 4/2001 | Bittner et al. |  |
| 6,302,010 | B1 | * | 10/2001 | Holler | 89/36.08 |
| 6,305,010 | B2 | * | 10/2001 | Agarwal | 717/126 |
| 6,314,562 | B1 |  | 11/2001 | Biggerstaff |  |
| 6,324,689 | B1 | * | 11/2001 | Lowney et al. | 717/154 |
| 6,353,887 | B1 | * | 3/2002 | Cotugno et al. | 713/165 |
| 6,397,380 | B1 |  | 5/2002 | Bittner et al. |  |
| 6,457,172 | B1 |  | 9/2002 | Carmichael et al. |  |
| 6,978,448 | B1 | * | 12/2005 | Plummer et al. | 717/140 |

* cited by examiner

*Primary Examiner*—Wei Y. Zhen
*Assistant Examiner*—Phillip H Nguyen
(74) *Attorney, Agent, or Firm*—Lee & Hayes, PLLC

(57) ABSTRACT

Systems and methods provide for the rewriting and transformation of a code unit through an extensible, composable, set of code rewriters that can be implemented at various phases throughout the development, deployment, and execution of the code unit. The described systems and methods provide a powerful way for program developers and system administrators to implement code transformations at different stages throughout the development, deployment, and execution of programs that is largely independent of such programs and does not significantly increase the complexity of the source programs, compilers, or execution environments.

9 Claims, 10 Drawing Sheets

CODE REWRITING

TECHNICAL FIELD

The present disclosure relates to rewriting code, and more particularly, to a composable set of rewriters capable of rewriting code throughout the life-cycle of the code, from its development through its execution.

BACKGROUND

Program development typically follows a cycle of writing source code, editing the source code, compiling the source code, and then executing the resulting binary code. The development cycle may occur in various computing environments ranging, for example, from an individual developer's computer to a system of computing devices that includes the developer's computer, intermediate computers, and an enterprise of deployment computers interconnected through one or more networks. Thus, the cycle may also include intermediate stages that involve, for example, the installation and execution of the program on an intermediate computer prior to the installation and execution of the program on final deployment computers.

There are various reasons why a program might need to be transformed at some point throughout its development cycle. For example, there may be a need to introduce code into a program to monitor its execution and determine whether it is running correctly. Such "watchdog" code might perform tasks such as counting the number of times a particular function is called or sending the output of a particular function to a file. If a problem is discovered in the execution of a program, there may be a need to further transform the program to include additional code designed to discover the source of the problem.

Some programming languages support features that enable certain transformations such as the introduction of "watchdog" code. However, these transformation features are typically very limited. In addition, such features are typically implemented through compilers that are language-specific. Thus, one programming language may support a "watchdog" code transformation feature while another may not.

Other reasons for transforming a program during development might include the varying execution environments in which the program will be deployed. For example, a program may run as part of an operating system, a database, or an application program. The semantics, or defined system behaviors, may vary from one environment to another, or they may vary within an environment when the environment changes (e.g., an operating system upgrade). Thus, a program may behave differently in different and changing environments. Therefore, ensuring that a program performs in a consistent manner in different environments may require a program transformation. Such transformations can be achieved by the developer introducing environment-specific code into the source, or by introducing such code through the compiler. Another option is to transform the execution environment. Each of these options has the disadvantage of significantly increasing the complexity of either the program, the compiler, or the execution environment.

Accordingly, there is a need for a way to implement code transformations at different stages throughout the development and deployment cycle of a program that does not significantly increase the complexity of the source program, compiler, or execution environment.

SUMMARY

A system and methods provide for the rewriting and transformation of code units through the use of an extensible, composable, set of code rewriters. Rewriters can be applied implemented at various phases throughout the development and deployment of a code unit. A rewrite manager can initiate the rewriting of the code unit for various reasons including information embedded by a developer within the code unit itself, a system policy such as a security or installation policy, and so on. A rewrite manager identifies one or more rewriters and executes the rewriters against the code unit, generating a rewritten code unit or a series of successive versions of rewritten code units. The rewrite manager may also sequence the rewriters to perform rewrites on the code unit in a particular order. Prior to executing the rewriters against the code unit, the rewrite manager verifies the trustworthiness of both the code unit and the rewriters. Rewritten code units are stored in a cache so that subsequent calls to execute the code unit do not result in a repeat of the rewriting process. A rewritten code unit can be accessed directly from the cache and executed.

BRIEF DESCRIPTION OF THE DRAWINGS

The same reference numerals are used throughout the drawings to reference like components and features.

DETAILED DESCRIPTION

Overview

The following discussion is directed to systems and methods that provide for the rewriting and transformation of a code unit through an extensible, composable, set of code rewriters that can be implemented at various phases throughout the development and deployment of the code unit. Advantages of the described systems and methods include providing a powerful way for program developers and system administrators to implement code transformations at different stages throughout the development and deployment of programs that does not significantly increase the complexity of the source programs, compilers, or execution environments.

Exemplary Environment

Figure 1:
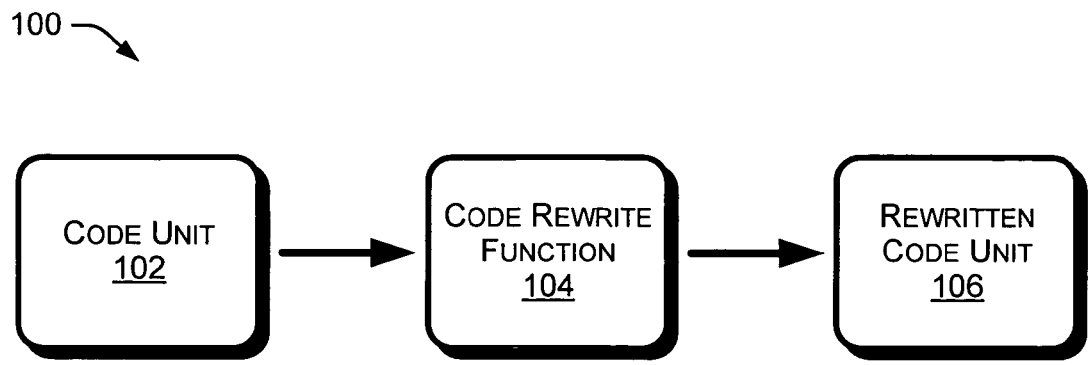
FIG. 1 illustrates an exemplary process for rewriting code that may occur in various development and deployment environments.

FIG. 1 illustrates a basic process 100 for rewriting code that may occur in various development and deployment environments. The process 100 for rewriting a code unit 102 includes the code unit 102 encountering a rewrite function 104 that applies one or more code rewriters to the code unit 102 to generate a rewritten code unit 106. Code unit 102 may include, for example, object modules compiled from a language-specific compiler into native code ready for execution on a PC, a collection of DLL or executable files deployed in an intermediate language (e.g., an abstract and/or machine independent language) for a managed code environment, a script program written in an interpreted language, and so on.

Code unit 102 may encounter a rewrite function 104 at various stages of development and deployment. Therefore, a rewrite function 104 may be operable in different scenarios and on different computers involved in the development, deployment, and execution of code unit 102. In general, a rewrite function 104 receives code unit 102, determines if the code unit is to be rewritten, identifies and sequences which rewriters are to be applied to rewrite the code unit, and facilitates the execution of the rewriters against the code unit, resulting in rewritten code unit 106. A rewrite function 104 generally encompasses and/or includes a rewrite manager, one or more code rewriters configured to rewrite code unit 102, and information (e.g., a rewriter list) identifying which rewriters are to be applied to the code unit and in what order.

Figure 2:
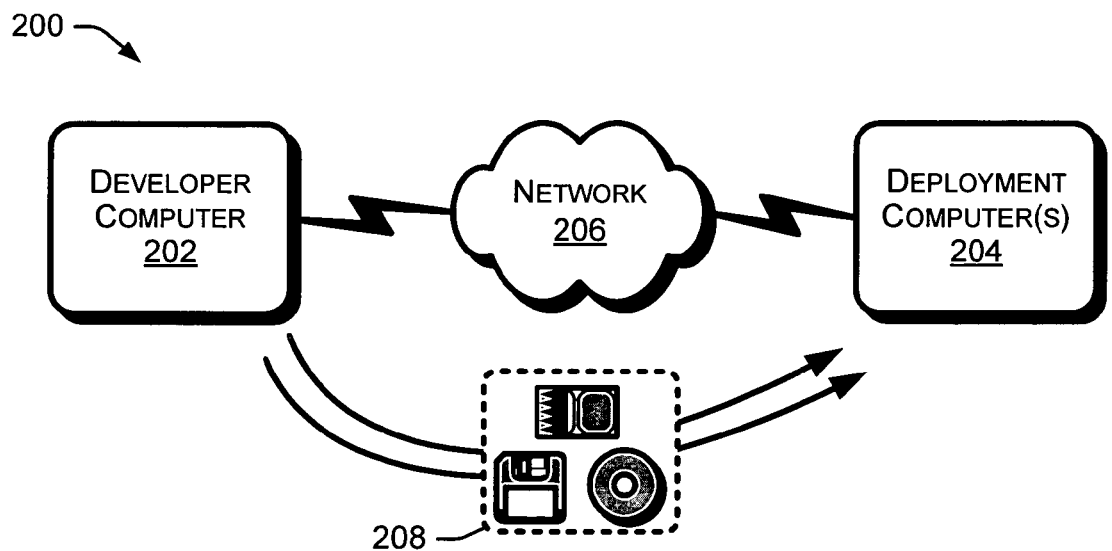
FIG. 2 illustrates an exemplary computing environment suitable for implementing code rewriting.
Figure 3:
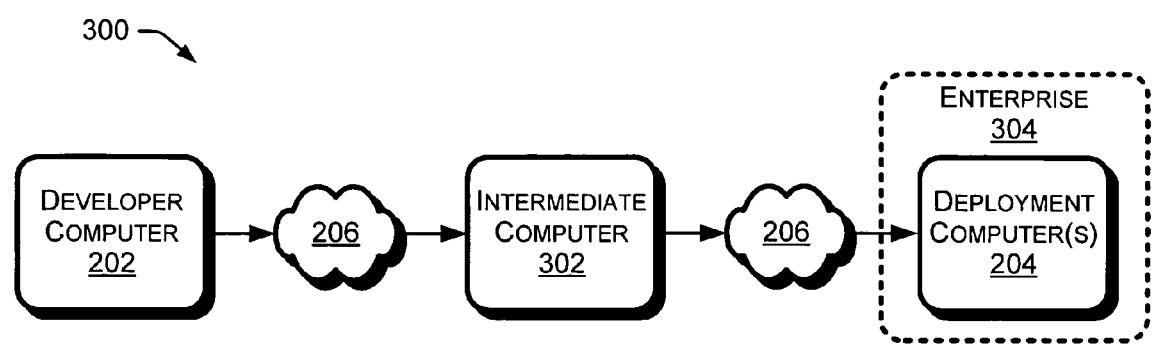
FIG. 3 illustrates another exemplary computing environment suitable for implementing code rewriting.

FIGS. 2 and 3 illustrate exemplary environments suitable for implementing code rewriting. The exemplary environments of FIGS. 2 and 3 are provided by way of example only and not by way of limitation. Therefore, it is understood that many other computing environments are possible in which code rewriting may be implemented during various stages of code development and deployment as discussed herein.

The exemplary environment 200 of FIG. 2 shows a development and deployment scenario suitable for implementing code rewriting in which code is developed and distributed over relatively direct distribution channels. Typically, code unit 106 is developed on developer computer 202 and distributed to a deployment computer 204 where it can be installed and executed. However, it is understood that code unit 106 developed on computer 202 can also be installed and executed on computer 202, and that a code rewrite function 104 can be implemented against code unit 102 to generate a rewritten code unit 106 on either or both of computers 202 and 204.

Code unit 102 can be transferred from developer computer 202 to deployment computer 204 by several means including, for example, by downloading it from the developer computer 202 to the deployment computer 204 via a network 206, or by transferring it from the developer computer 202 to the deployment computer 204 on various portable media 208 (e.g., disc, compact flash card). Network 206 can include both local and remote connections depending on the particular system configuration. Thus, network 206 may include, for example, any one or a combination of a modem, a cable modem, a LAN (local area network), a WAN (wide area network), an intranet, the Internet, or any other suitable communication link.

FIG. 3 shows another exemplary environment 300 suitable for implementing code rewriting where code is developed and deployed over a more complex distribution system. The environment 300 includes a developer computer 202 and a deployment computer 204 as generally discussed above, in addition to an intermediate computer 302. Deployment computer 204 is within an enterprise computing system 304 such as a corporate intranet protected within a corporate firewall. In the FIG. 3 environment 300, the development and deployment of a code unit 102 may include transferring the code unit 102 from a development computer 202 to an intermediate computer 302 via network 206 prior to deploying code unit 102 on deployment computer(s) 204. Typically, such intermediate computers 302 are used for staging code units and distributing them to deployment computer(s) 204. Code rewrites occurring on the intermediate computer 302 may be different that those occurring on development or deployment computers. For example, code rewrites on intermediate computer 302 may rewrite code to be compatible with certain system and/or security requirements in place on deployment computer(s) 204 of enterprise 304. In addition, code unit 102 may be temporarily installed and executed on the intermediate computer 302 as part of its development in order to verify its performance prior to moving it down to deployment computer(s) 204 within enterprise 304. As discussed below with respect to an exemplary embodiment, code unit 102 may be rewritten by one or more rewriters at different stages throughout its development, installation, and execution on the various computers 202, 204, and 302 of environment 300.

Computers 202, 204 and 302 of FIGS. 2 and 3 may be implemented as any of a variety of conventional computing devices including, for example, a desktop PC, a notebook or other portable computer, a workstation, a server, a mainframe computer, and so on. Computers 202, 204 and 302 are typically capable of performing common computing functions, such as email, calendaring, task organization, word processing, Web browsing, and so on. Computers 202, 204 and 302 run an operating system such as a Windows® operating system from Microsoft® Corporation of Redmond, Wash. One exemplary implementation of a developer computer 202, a deployment computer 204, and an intermediate computer 302, is described in more detail below with reference to FIG. 14.

Exemplary Embodiments

Figure 4:
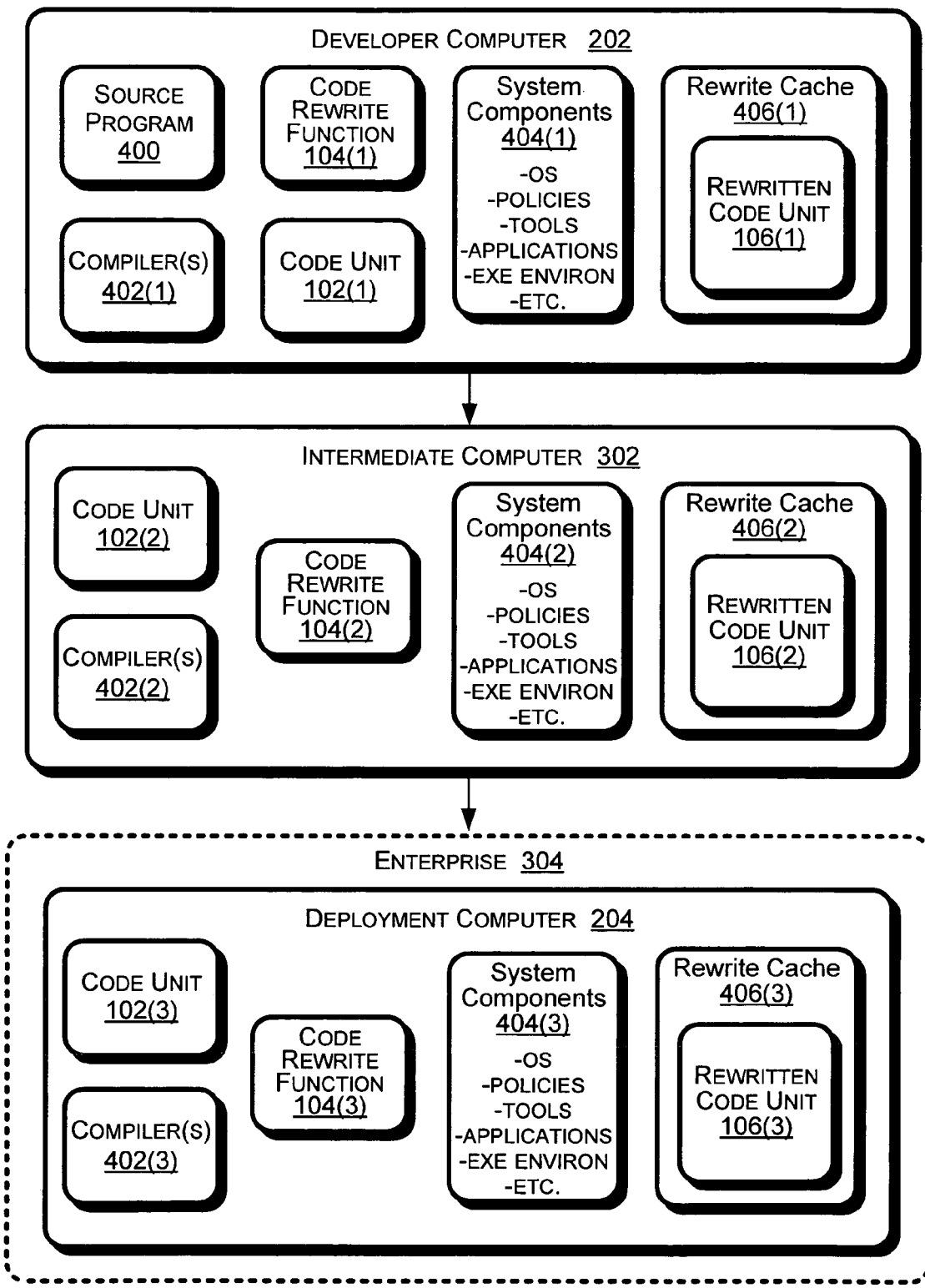
FIG. 4 illustrates an exemplary block diagram representation of a developer computer, an intermediate computer, and a deployment computer detailing various components that facilitate code rewriting.

FIG. 4 is a block diagram representation of computers 202, 204, and 302 illustrating various components useful for describing code rewriting within the exemplary environment 300 of FIG. 3. Code rewriting can occur on any or all of computers 202, 204, and 302, and code rewriting on one computer may affect code rewriting on the other computers. For example, the implementation of a rewriting function 104 on development computer 202 may result in a rewritten code unit that is transferred to an intermediate computer 302. The rewritten code unit from development computer 202 may be rewritten again by the intermediate computer 302 and then transferred to a deployment computer 204, where it may be rewritten yet again.

Developer computer 202 in FIG. 4 includes a source program 400 written by a developer in a programming language such as C, C++, C#, Java, Microsoft Visual Basic®, etc. Each of the computers 202, 302, and 204 of FIG. 4 may include various compilers 402. Compilers 402 may vary from one computer to another, and they are therefore designated with reference numerals 402(1), 402(2), and 402(3) on development computer 202, intermediate computer 302, and deployment computer 204, respectively. Compilers 402 may include language-specific compilers, each configured to compile a source program of a specific language into one or more code units 102. A code unit 102 may include, for example, object modules compiled into native code ready for execution on a PC, a collection of DLL or executable files compiled as bytecode or another intermediate language (e.g., an abstract and/or machine independent language) suitable for execution in a managed code environment, a script program written in an interpreted language, and so on. Therefore, compilers 402 may include native code compilers that compile source language into a native code that runs on a particular platform, and managed code compilers (e.g., Java compilers, .NET compilers) that compile source language into managed code such as intermediate language or bytecode.

In addition, compilers 402 may include pre-execution compilers that convert platform-independent code (i.e., managed code), such as intermediate language or bytecode, into native code that can execute on a particular processor. Thus, compilers 402 may also include a JIT (just-in-time) compiler that compiles managed code (e.g., bytecode, intermediate language) into native code just prior to execution, and a compile-on-install compiler that pre-compiles managed code into native code so that it is ready for execution upon installation.

Figure 5:
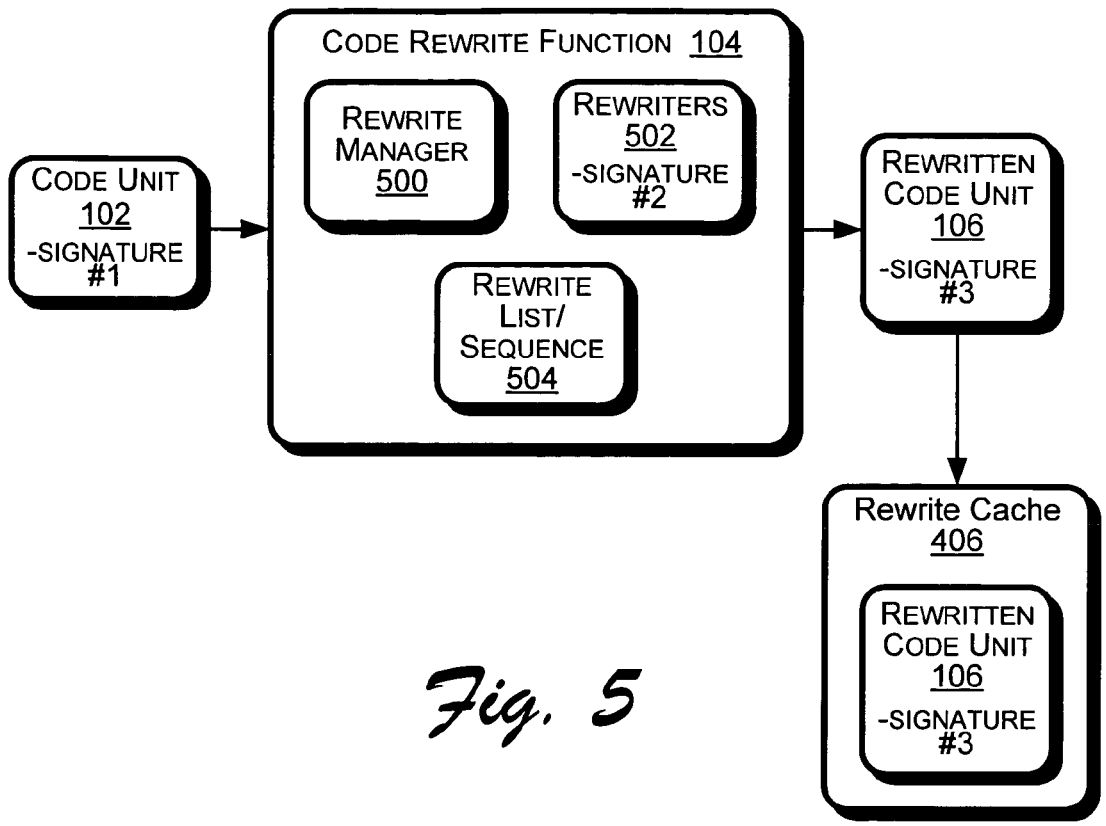
FIG. 5 illustrates an exemplary block diagram detailing components for implementing the exemplary process for rewriting code of FIG. 1.

Each computer 202, 302, and 204 may include a code rewrite function 104 configured to receive a code unit 102, determine if the code unit is to be rewritten, identify and sequence rewriters that will be applied to rewrite the code unit 102, and facilitate the execution of the rewriters against the code unit (e.g., load the code unit 102 and appropriate rewriters into RAM for execution on a processor). As shown in FIG. 5, code rewrite function 104 encompasses and/or includes a rewrite manager 500, one or more code rewriters 502 configured to rewrite code unit 102, and information (e.g., a rewriter list 504) identifying which rewriters are to be applied to the code unit and in what order/sequence.

Figure 6:
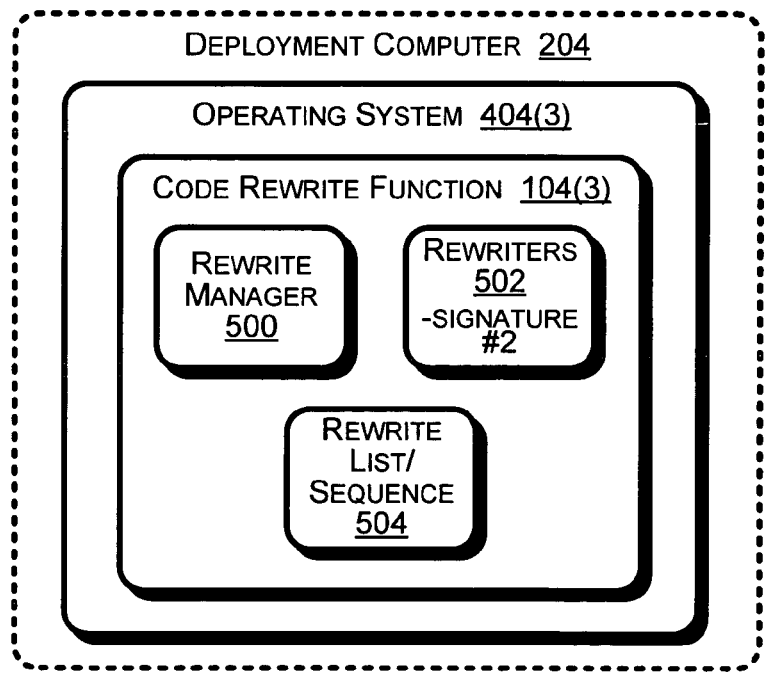
FIG. 6 illustrates that components for implementing a code rewrite process can be embedded as part of an operating system component.

Each computer 202, 302, and 204 also includes various system components 404, such as an operating system (OS), system policies (e.g., security policies), applications, tools, execution environments, etc. One or more of the components of the code rewrite function 104 (i.e., rewrite manager 500, rewriters 502, rewriter list 504) may be embedded within any one or more of the various system components 404. For example, FIG. 6 illustrates that all the components of the code rewrite function 104, including rewrite manager 500, rewriters 502, and rewriter list 504, are embedded as part of an operating system. This scenario may be useful when, for example, certain applications become incompatible with an updated version of an operating system. Inclusion of the rewrite function 104 (rewrite manager 500, rewriters 502, and rewriter list 504) within the updated operating system can be used to modify such applications to ensure their compatibility with the updated operating system.

Figure 7:
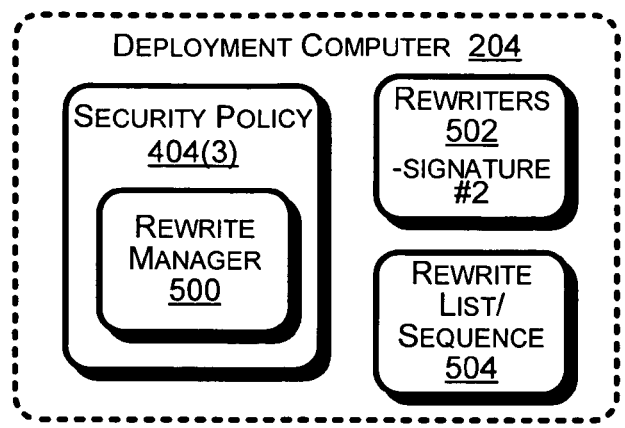
FIG. 7 illustrates components for implementing a code rewrite process as stand-alone modules and as part of various system components.
Figure 8:
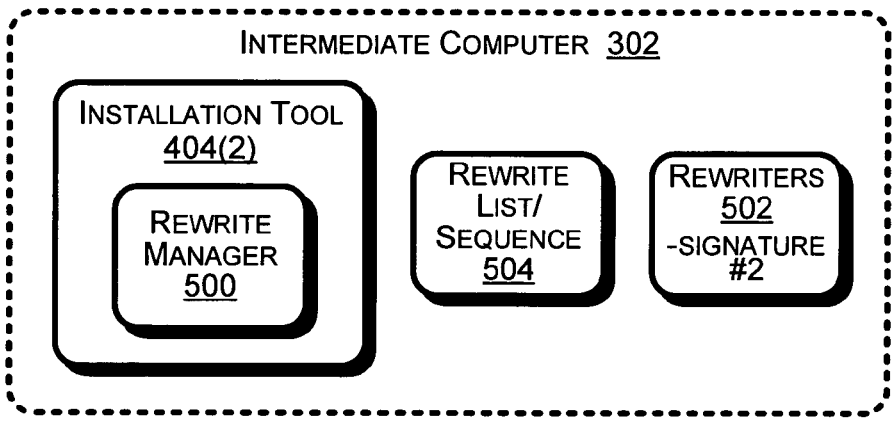
FIG. 8 illustrates components for implementing a code rewrite process as stand-alone modules and as part of various system components.

FIGS. 7 and 8 show example implementations illustrating that the components of the code rewrite function 104 can be stand-alone modules and/or can be dispersed among various system components 404. The rewrite manager 500 in FIG. 7 is a component of a system security policy 404(3) executing on a deployment computer 204, while rewriters 502 and the rewrite list 504 are stand-alone modules. Thus, as part of a security policy 404(3) being implemented on deployment computer 204, the rewrite manager 500 would execute to determine if code units need to be rewritten to comply with the security policy. If so, the rewrite manager would proceed to identify and sequence the appropriate rewriters 502 using rewrite list 504, and then would execute the identified rewriters against the code unit. In FIG. 8, the rewrite manager 500 is illustrated as a component of an installation tool 404(2) on an intermediate computer 302, while rewriters 502 and the rewrite list 504 are stand-alone modules. Thus, during installation of a code unit 102, the rewrite manager 500 within the installation tool 404(2) would execute to determine if the code unit needs to be rewritten. If so, the rewrite manager would proceed to identify and sequence the appropriate rewriters 502 using rewrite list 504, and then would execute the identified rewriters against the code unit.

Figure 9:
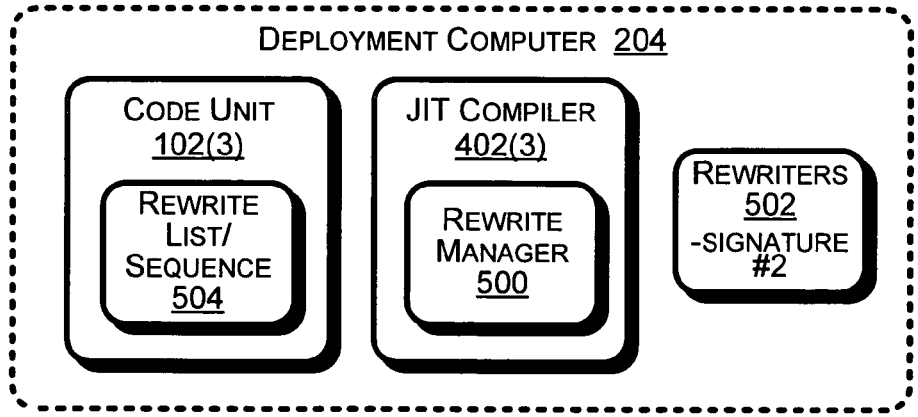
FIG. 9 illustrates components for implementing a code rewrite process included within the code unit itself.

FIG. 9 illustrates how some of the components of the code rewrite function 104 can be included within the code unit 102 itself by a developer. As shown in FIG. 9, a developer has included rewriter list 504 within the code unit 102 itself. A rewrite manager 500 is shown as part of a JIT (just in time) compiler 402, while the rewriters 502 are in a stand-alone module. Thus, a developer can use the code unit 102 itself as a way to compose a set of rewriters 502 to rewrite the code unit 102. For example, a developer may embed rewrite instructions (e.g., tags, attributes, strings, etc.) within the source program 400 that are passed into the newly compiled code unit 102 and that instruct a rewrite manager 500 to rewrite the code unit 102 using one or more rewriters. In this way, the developer has the ability to compose a set of code rewriters that can be implemented at various phases throughout the development and deployment of the code unit. Upon a subsequent pre-execution compilation of code unit 102 by JIT compiler 402, the rewrite manager 500 within JIT compiler 402 determines from the rewriter list 504 embedded in the code unit, which rewriters 502 to execute against the code unit. The code unit 102 is thus rewritten just prior to its compilation into native code by JIT compiler 402 and subsequent execution.

This process enables a developer to string together, or "compose", a set of rewriters that will each, in turn, modify a code unit in a particular way. In a preferred embodiment, as a code unit is successively rewritten by each rewriter in the "composed" set of rewriters, the format of each rewritten code unit remains uniform. Therefore, the code unit that is input to a rewriter has the same format as the code unit that is output from that rewriter. This allows the developer to compose an arbitrary set of rewriters, each of which takes in a code unit and puts out a code unit in the same format or representation. In an alternative embodiment, each rewriter may output a code unit in a different format than the code unit that was input. However, this alternative somewhat restricts the degree of flexibility and arbitrariness available to the developer in composing the set of rewriters.

Referring again to FIG. 5, a general code rewriting process is illustrated that can be described with respect to any or all of the computers 202, 304, and 204 shown in FIG. 4. The code rewriting process includes the implementation of a trust model that is specifically suited to account for the various transformations that may occur to a code unit throughout its development and deployment, for example, on computers 202, 304, and 204. Thus, rewrite manager 404 supports a trust model that provides for verifying the identity and trustworthiness of code units before and after they have been rewritten.

In a typical trust model, a developer attaches a digital signature to a code unit. The digital signature can then be used to authenticate the identity of the code unit and ensure that the code unit has not been tampered with or altered from its originally distributed version. The technology and software for using digital signatures is generally available. In one such technology, a hash or mathematical summary of a code unit can be obtained using appropriate software. The hash can then be encrypted using a private key obtained from a public-private key authority. The encrypted key is the digital signature that can be sent along within the code unit. A user (i.e., a computer) to which the assembly has been sent then makes a hash (mathematical summary) of the code unit and uses the public key to decrypt the hash. When the hash matches, the code unit is authenticated. Thus, the general trust principle is that if a code unit is altered from its originally "signed" version, then its signature will also have been altered, and the code unit will no longer be trusted.

Because the currently described code rewriting system includes the rewriting of code units, the typical trust model described above is not suitable. Digitally "signed" code units altered through one or more code rewrites would not be verifiable as trustworthy based on the changes that are made during the rewriting. Accordingly, the general code rewriting process illustrated in FIG. 5 includes the implementation of a trust model that is specifically suited to account for the various transformations that may occur to a code unit throughout its development and deployment, for example, on computers 202, 304, and 204.

In the general rewriting process illustrated in FIG. 5, a code unit 102 is received by rewrite manager 500 of code rewrite function 104. The code unit includes a digital signature, "Signature #1". Rewrite manager 500 initially determines if code unit 102 needs to be rewritten. As discussed above with respect to FIGS. 6-9, this determination can be made in various ways. For example, rewrite manager 500 may determine that code unit 102 needs to be rewritten when the code unit 102 is compiled (e.g., into native code, bytecode, intermediate language) from a source program 400 on developer computer 202.

The rewrite manager 500 then identifies and sequences the appropriate rewriters from a group of rewriters 502. This is done by consulting a rewrite list 504. The rewrite list 504 identifies rewriters to rewrite manager 500 and provides the sequence in which the identified rewriters are to be executed against the code unit 102. The rewrite manager 500 then accesses the identified rewriters from a group of one or more rewriters 502, and loads them into memory (RAM) along with the code unit 102. Prior to executing the identified rewriters against the code unit 102, the rewrite manager 500 authenticates digital signatures of the rewriters and the code unit 102 (e.g., "Signature #1" of code unit 102 and "Signature #2" of rewriters 502 by decrypting a hash or mathematical summary using a public key) to verify their identity and trustworthiness. If the digital signatures are authentic, the rewrite manager executes the identified rewriters against the code unit 102 to generate a rewritten code unit 106. The rewrite manager may also generate a digital signature for the rewritten code unit 106 (e.g., "Signature #3", which is a hash or mathematical summary of rewritten code unit 106 encrypted using a private key) and store the rewritten code unit 106 in a rewrite cache 406 along with the signature.

Figure 10:
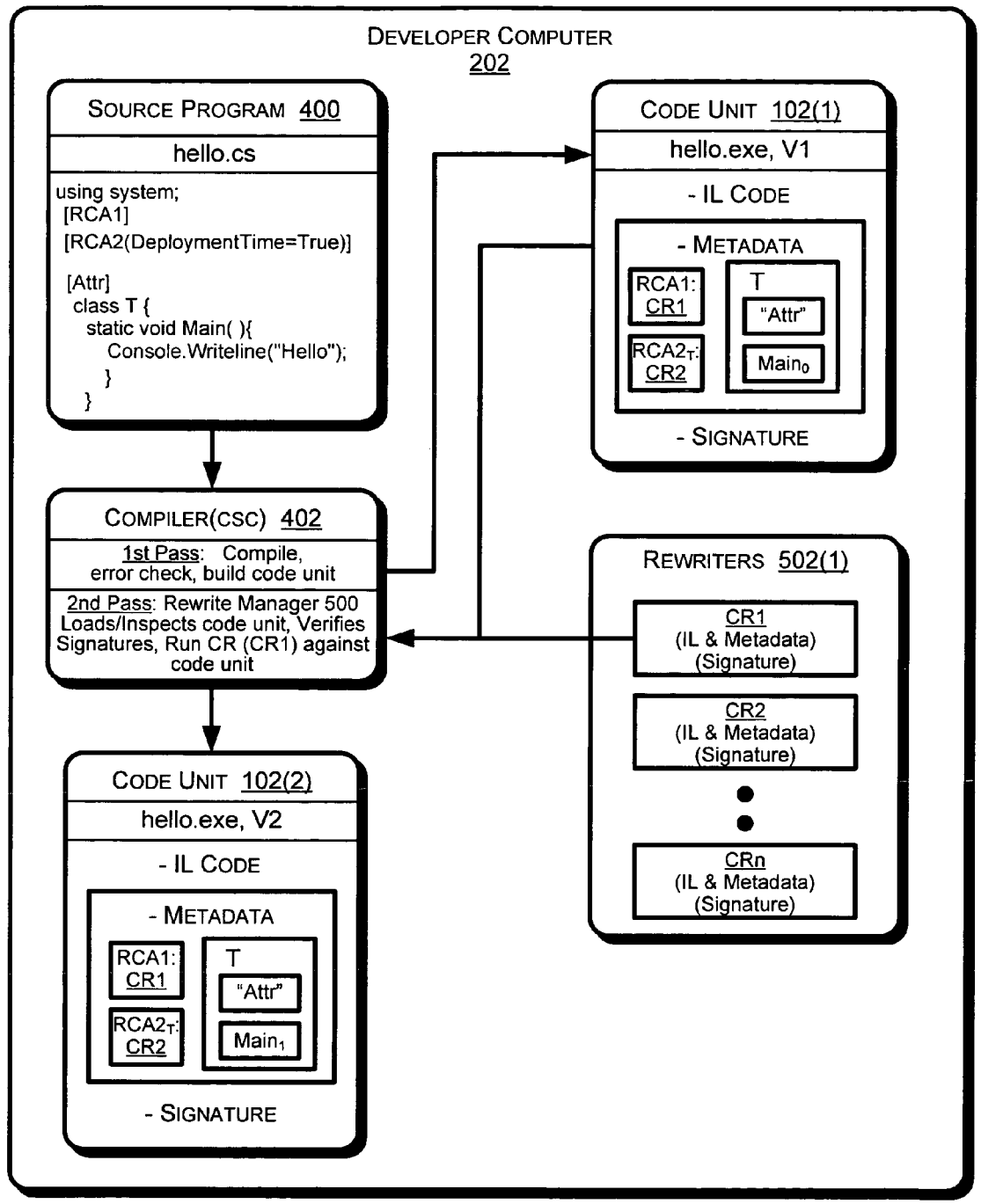
FIG. 10 illustrates an exemplary code deployment environment consistent with the environment shown in FIG. 2.
Figure 11:
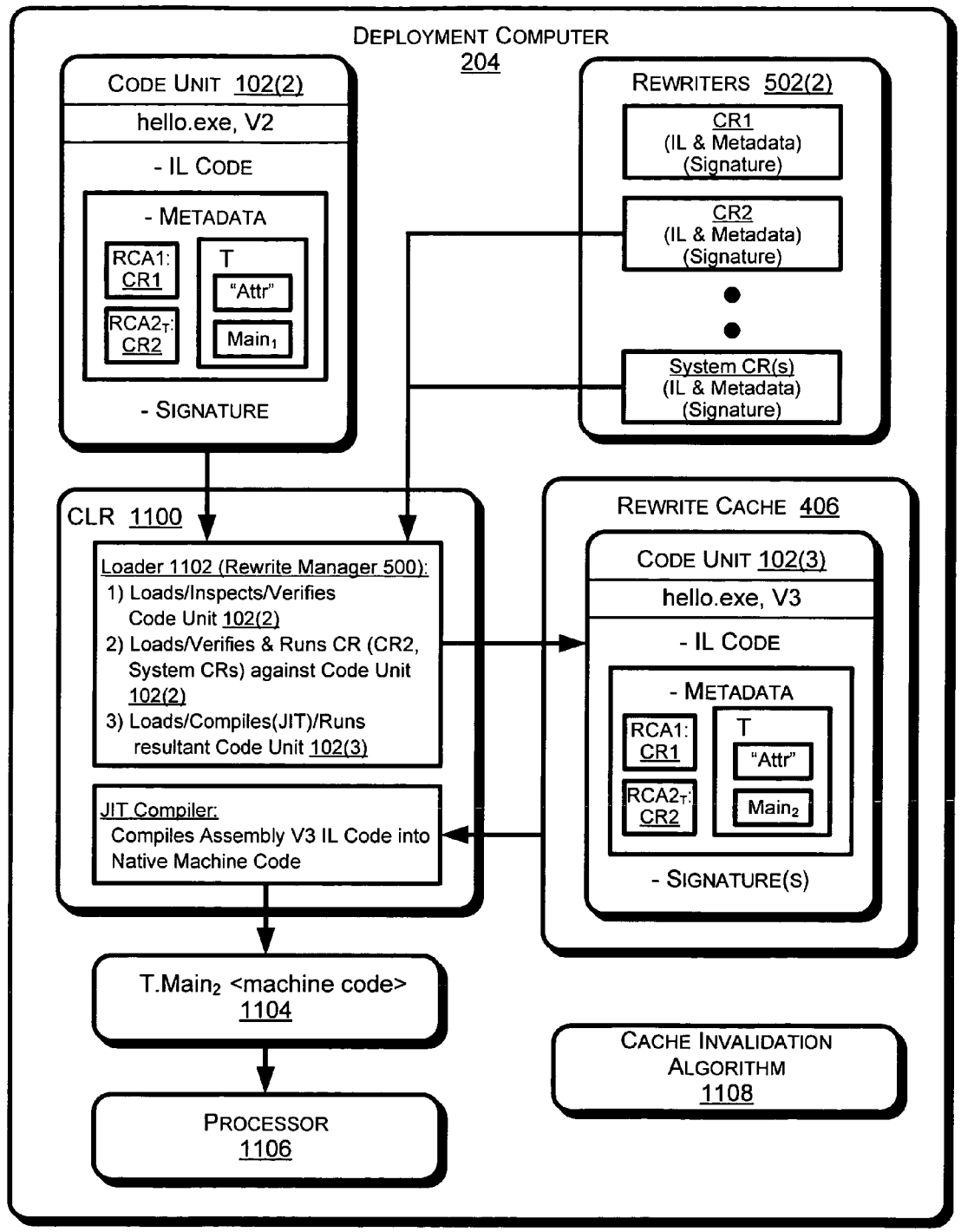
FIG. 11 illustrates an exemplary code deployment environment consistent with the environment shown in FIG. 2.

In general, a code rewriter 502 executed against a code unit 102 can open the code unit file on disk (if it is not already in memory), load in the native code, bytecode, intermediate language, metadata, etc., and recover the logical structure of the modules, their types, their methods, etc. into "in-memory" data structures. The code rewriter can then traverse those data structures and make arbitrary modifications to representations of the types and methods, for example, by changing the body of a method (also known as a 'function') to insert or remove or modify code arbitrarily. The code rewriter may insert or delete whole modules, types, methods, fields, etc. Where rewriting is being directed from within a code unit itself (e.g., by tags, attributes, strings, etc.; FIG. 9 above; FIGS. 10 and 11 below) the modifications being made can in turn be guided by additional directives, tags, attributes, strings, etc., external to the code unit, or embedded within the code unit, and sometimes pertaining to specific elements or sites within the code unit, that modify or steer the kinds of changes the particular code rewriter is making to the code unit.

Referring again to FIG. 4, the described trust model accounts for the various transformations that may occur to a code unit 102 throughout its development and deployment on computers 202, 304, and 204. For example, rewritten code unit 106(1) on developer computer 202 may be transferred to intermediate computer 302 as code unit 102(2). Although code unit 102(2) has been modified from its original version of code unit 102(1) on developer computer 202 (i.e., being modified into rewritten code unit 106(1)), the code unit 102(2) is typically digitally signed after the code modification takes place. Therefore, intermediate computer 302 will still able to authenticate the identity and trustworthiness of code unit 102(2) based on the digital signature that will accompany it.

The rewrite cache 406 is used to store rewritten code units 106 so that subsequent calls for compiling, installing, executing, etc., a code unit 102 do not result in a repeat of the rewrite process. Thus, where a code unit 102 has already been rewritten by a particular rewriter or set of rewriters 502, the rewrite manager 500 stores the resulting rewritten code unit 106 in a rewrite cache 406 and accesses the rewritten code unit 106 from the cache 406 when necessary to avoid having to repeat the rewrite process with respect to the particular rewriter or set of rewriters 502. Once a code unit 102 is rewritten and stored in rewrite cache 406 as a rewritten code unit 106, it can be accessed directly from the cache 406 and be executed without going through the rewrite process again.

FIGS. 10 and 11 illustrate a more specific example of a code rewriting function 104 being implemented with respect to code in a managed code environment. A managed code environment manages the execution of programs written in any of several supported languages, allowing the programs to share common object-oriented classes written in any of the languages. Examples of managed code environments include the Java virtual machine that Sun Microsystems furnishes for running programs compiled from the Java language, and the Common Language Runtime (CLR) which is part of the .NET™ platform created by Microsoft Corporation of Redmond, Wash., USA. The example illustrated in FIGS. 10 and 11 is described herein with reference to Microsoft's CLR. Additional information regarding the basics of the .NET™ Framework can be found in a number of introductory texts, such as Pratt, Introducing Microsoft .NET, Third Edition, Microsoft Press, 2003.

The CLR is the heart of the Microsoft .NET™ Framework and provides the execution environment for all .NET code. Thus, code that is built to make use of the CLR, and that runs within the CLR, is referred to as "managed code." The CLR provides various functions and services required for program execution, including just-in-time (JIT) compilation, allocating and managing memory, enforcing type safety, exception handling, thread management and security. The CLR is loaded upon the first invocation of a .NET™ routine. For best performance, managed code is typically compiled to native code just prior to execution.

When writing managed code, the deployment unit is called an assembly which is a collection of one or more files that are versioned and deployed as a unit. An assembly is the primary building block of a .NET™ Framework application. All managed types and resources are contained within an assembly and are marked either as accessible only within the assembly or as accessible from code in other assemblies. An assembly is packaged as a DLL or executable (EXE) file. While an executable can run on its own, a DLL must be hosted in an existing application.

For purposes of simplifying the discussion, FIGS. 10 and 11 illustrate an exemplary deployment environment consistent with the environment 200 discussed above with reference to FIG. 2. Therefore, a source program 400 is developed on a developer computer 202 and is distributed in a relatively direct manner (e.g., downloading it via network 206 or transferring it on a disc) to a deployment computer 204. In addition, for the sake of consistency, a deployment unit of code that might otherwise be referred to as an "assembly" in a managed code environment, is referred to as a code unit in the code rewriting example of FIGS. 10 and 11.

In FIG. 10, an exemplary source program 400, named "hello.cs", is written in the C# programming language and includes "rewrite custom attributes" that request specific code rewriters, and other custom attributes that are not specific to code rewriting. The attributes are all designated within square brackets, "[ ]". Both such forms of custom attributes are embedded in the program source code 400 and are applied, for example, to classes in order to describe characteristics of those classes. Thus, in source program 400 of FIG. 10, the attribute "[Attr]" is a custom attribute being applied to the class "T" to describe some characteristic of class "T".

Custom attributes are customizable annotations that a developer can include in a source program 400 that get carried through compilation 402 of the source program 400 into the code unit 102(1). In general, a .NET Framework embodiment allows arbitrary extensibility of the set of custom attributes. The set of custom attributes is not fixed. Rather, any code may introduce, or be the target of such, new user-defined custom attributes. Custom attributes can be applied to the code unit 102(1), to a type, to a method, and so forth. Custom attributes that are applied to a code unit 102(1) whose type derives from a rewrite custom attribute type, are called "rewrite custom attributes". Rewrite custom attributes will trigger the application of a code rewriter (e.g., from a group of code rewriters 502) on the code unit 102(1). Rewrite custom attributes can therefore make up a rewrite list 504 that specifies or determines the rewriters to be applied to the code unit 102(1). In source program 400, the rewrite custom attributes "RCA1" and "RCA2" are identified within the brackets "[RCA1]" and "[RCA2]", respectively. A developer can specify within a rewrite custom attribute when the identified code rewriter is to be applied against the code unit 102(1), thus indicating a sequence for executing identified rewriters against the code unit 102(1).

Compiler 402 of FIG. 10 is a C# compiler (CSC) specific to the C# programming language. CSC compiler 402 is one of various language-specific, .NET compilers that may reside on developer computer 202 for the purpose of compiling different language-specific source programs into code units comprising common, processor-independent Intermediate Language (IL) and metadata. On a first pass, compiler 402 compiles source program 400, performs error checking, and builds code unit 102(1) (version 1 of the code unit 102), named "hello.exe". Representations of custom attributes, including rewrite custom attributes ("[RCA1]" and "[RCA2]") in the source program 400 are passed through into metadata of the code unit 102(1).

Code units 102 in the managed code example of FIGS. 10 and 11, include IL and metadata. The IL describes, in an abstract manner, operations that take place in the bodies of methods. The metadata includes the custom attributes and tables that describe the structure of the code unit: the code unit consists of a collection of modules, each module consists of a collection of type definitions, each type definition is a collection of fields and methods (code, functions), each method has a return type and a list of formal argument types, etc. In this case, the metadata indicates there are two rewriter custom attributes (RCA1, RCA2) that have been passed from the source program 400, and that there is a type called "T" and a table that describes the methods of T. One of the methods of T is called Main. Other custom attributes such as attribute "Attr", may also exist, but these are not rewriter custom attributes and do not trigger any code rewriting.

On a second pass, a rewrite manager component 500 of compiler 402 is configured to inspect the code unit 102(1) built from the first pass. Upon inspection, if the rewrite manager 500 of compiler 402 finds any rewrite custom attributes (e.g., RCA1, RCA2) requesting a code rewriter 502, the rewrite manager 500 loads into memory (not shown) and runs the requested code rewriters 502, in turn, against the code unit 102(1). The rewrite manager 500 additionally authenticates digital signatures associated with both the code unit 102(1) and code rewriters 502 to verify their identity and trustworthiness prior to running the requested code rewriters 502 against the code unit 102(1), as generally discussed above.

In this example, two rewrite custom attributes called RCA1 and RCA2 are requesting, respectively, that assembly rewriters CR1 and CR2 be applied to modify the code unit 102(1). However, custom attribute RCA2 is tagged with an indication (e.g., a subscript "T") that the developer does not want the CR2 code rewriter to be run against the code unit 102(1) on the developer computer 202. The source program 400 includes a "DeploymentTime=True" tag on the second rewrite custom attribute, RCA2, which the compiler 402 carries through to the code unit 102(1) in the first pass. Therefore, on a second pass, the rewrite manager 500 of compiler 402 recognizes that the CR2 code rewriter requested by the tagged attribute RCA2, is not to be run against the code unit 102(1) on the developer computer 202. Therefore, in this example, only code rewriter CR1 is run against code unit 102(1) on developer computer 202. This results in the modified code unit 102(2) (version 2 of the code unit 102). In addition, compiler 402 optionally generates and attaches a digital signature to the modified code unit 102(2) in a manner discussed above. The resulting version of the code unit 102(2) gets distributed to deployment computer 204 for installation and execution. Note that the illustration of the method "Main$_1$," of class T in FIG. 10 is intended to indicate that the original method "Main$_0$" of class T within code unit 102(1) has been modified from its original version by CR1.

Rewrite custom attributes that have been tagged for implementation later, such as on deployment computer 204 (e.g., RCA2$_T$), are passed on to the modified code unit 102(2). Other rewrite custom attributes whose requested code rewriters have already been applied to the code unit 102(1) on developer computer 202 (e.g., CR1) may also be passed through to the modified code unit 102(2), as shown in FIG. 10. However, this would not be necessary since the purpose of these attributes would already have been served.

Referring to FIG. 11, deployment computer 204 may include any number of application program code units such as code unit 102(2) distributed, for example, from a developer computer 202. As discussed above, a code unit 102 includes IL code and metadata compiled on a .NET compiler and configured to execute in a managed execution environment of the CLR (common language runtime) 1100. In addition, a code unit 102 may also include various rewriter custom attributes such as RCA1 and RCA2 configured to request a code rewriter for modifying the code unit 102 at different times, such as when the code unit 102 is installed on the deployment computer 204. Further, a code unit 102 may include one or more digital signatures for verifying the authenticity of the code unit 102 itself and any code rewriters 502 being requested by rewriter custom attributes within the code unit 102.

When code unit 102(2) is launched on deployment computer 204, a rewrite manager 500 embodied for example, as the loader 1102 in the CLR 1100, loads the code unit 102(2) into memory and inspects it. Upon inspection, the rewrite manager 500 of CLR 1100 determines the authenticity and trustworthiness of the code unit 102(2). The authenticity is verified based on the code unit's digital signature found within the code unit 102(2). One example of this verification using a mathematical hash and a public-private key authority is briefly described above. The trustworthiness of the code unit 102(2) may also be determined, in part, on the basis of some other additional security policy of the CLR 1100. For example, the CLR 1100 security policy may trust code units that come from certain distributors or Web sites, and it may reject code units that come from certain other distributors or Web sites. Generally, a security policy will trust system code units that have been previously installed on deployment computer 204.

Upon inspection of code unit 102(2), the rewrite manager 500 of CLR 1100 determines if there are any latent (pending) rewrite custom attributes (i.e., rewrite custom attributes tagged for implementation on deployment computer 204 before execution) such as $RCA2_T$ that are requesting a code rewriter 502(2) to modify the code unit 102(2) before execution on the deployment computer 204. In addition to latent rewrite custom attributes that request a rewriter to modify code unit 102(2), the CLR 1100 itself may initiate one or more system code rewriters that it knows need to be run against the code unit 102(2). One example of a system rewriter is an "application compatibility rewriter" which is discussed below in greater detail.

When rewriters are being requested, the rewrite manager 500 of CLR 1100 loads the first of any such rewriters from a set of resident rewriters 502(2), and initiates the same type of authenticity and trustworthiness check performed on the code unit 102(2). Thus, in the FIG. 11 example, rewrite manager 500 of CLR 1100 loads CR2 from rewriters 502(2) and verifies the authenticity and trustworthiness of CR2.

After a successful verification of the code unit 102(2) and a rewriter (e.g., CR2), the rewrite manager 500 of CLR 210 runs the rewriter CR2 against the code unit 102(2), resulting in the modified code unit 102(2). If other rewrite custom attributes within code unit 102(2) are requesting the use of additional rewriters, then the rewrite manager 500 of CLR 1100 loads, verifies, and runs the additional rewriters against the code unit 102(2) in the same manner. After all the requested rewriters have been applied to code unit 102(2), the final modified code unit 102(3) is stored in a rewrite cache 406 on deployment computer 204. (The rewrite manager 500 may also elect to cache one or more of the intermediate rewritten assemblies instead of just the final rewritten assembly.) The CLR 1100 then manages the compilation of modified code unit 102(3) into native machine code 1104 using JIT (just-in-time) compiler. The native machine code 1104 is then executed on a processor 1106.

In an alternate embodiment, the process of modifying code unit 102(2) into code unit 102(3) with code rewriters, and the subsequent translation of code unit 102(3) into native machine code 1104, may take place upon the installation of code unit 102(2) onto deployment computer 204 using a compile-on-install compiler that pre-compiles managed code into native code so that it is ready for execution upon installation.

Storing the final modified code unit 102(3) in the rewrite cache 406 on deployment computer 204 permits the rewrite manager 500 of CLR 1100 to forego the code rewriting process for all subsequent calls to execute code unit 102(3). Thus, when code unit 102(3) is launched in the future, the rewrite manager 500 of CLR 210 accesses the cached rewritten final version of code unit 102(3) from the rewrite cache 406 and manages the translation of the code unit 102(3) into native machine code 1104 for execution on processor 1106.

A cache invalidation algorithm 1108 is configured to determine whether the code units saved in the rewrite cache 406 remain valid. The algorithm 1108 typically institutes a predetermined policy for invalidating and discarding some or all of the contents of rewrite cache 406. For example, such a policy may include invalidating the cache when a code unit is changed or when parameters of a given code rewriter have changed.

Figure 12:
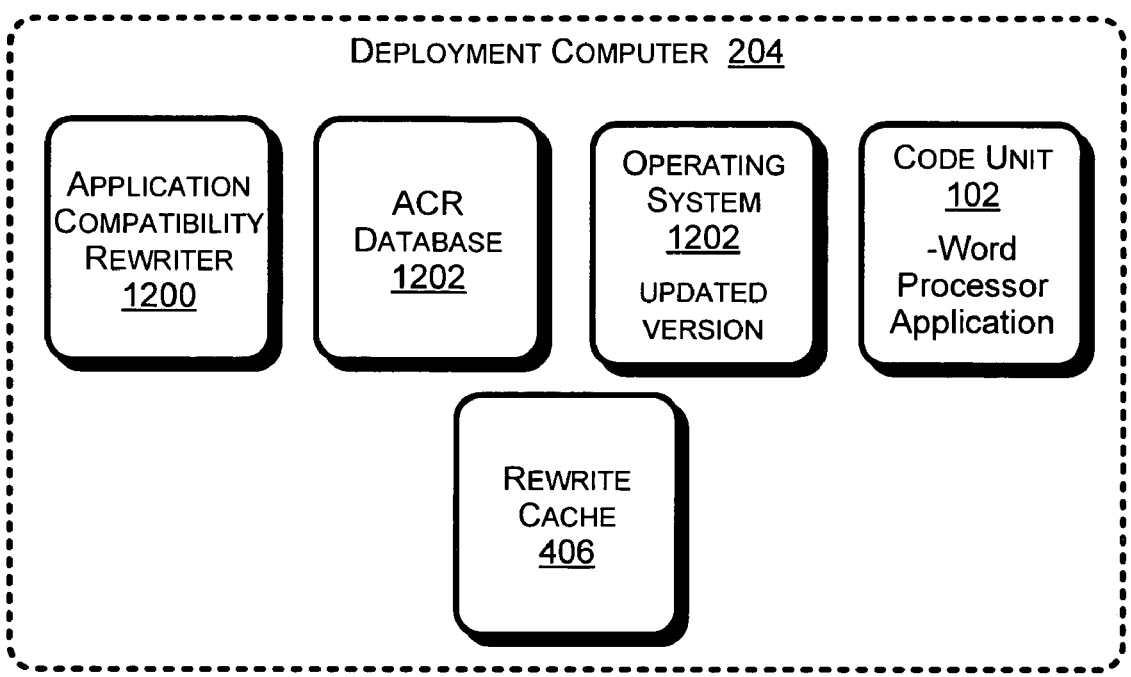
FIG. 12 illustrates an exemplary system code rewriter called an application compatibility rewriter.

FIG. 12 illustrates one example of a system code rewriter mentioned above with respect to FIG. 11. FIG. 12 shows an "application compatibility rewriter" 1200 on a deployment computer 204, along with other components that facilitate the implementation and discussion of the application compatibility rewriter 1200, including an ACR database 1202, operating system 1204, a rewrite cache 406, and code unit 102. Although the current discussion of application compatibility rewriter 1200 is not in the context of a managed code environment and the CLR, it is to be understood that this discussion applies generally to both managed and non-managed code environments.

In general, application compatibility rewriter 1200 is a code rewriter that accounts for changes that are made in the platform/operating system that are inconsistent with particular existing application programs. For example, code unit 102 of FIG. 12 indicates that it is a word processor application while operating system 1204 indicates that it is an updated version. Often times, when an operating system is upgraded, certain application programs need to be patched or fixed in order to continue running properly in the new operating system environment.

The application compatibility rewriter 1200 maintains the compatibility of various application programs with updated versions of a platform/operating system. For example, when an attempt is made to load a code unit 102 for execution, application compatibility rewriter 1200 is configured to examine the code unit 102 and determine if it is compatible with the updated version of operating system 1204. Application compatibility rewriter 1200 identifies the code unit 102 (e.g., a certain word processing application) and then consults the ACR database 1202 to see if any part of the code unit 102 needs to be rewritten for compatibility with the updated operating system 1204. If so, application compatibility rewriter 1200 applies the appropriate fixes to the code unit 102.

Exemplary Methods

Figure 13:
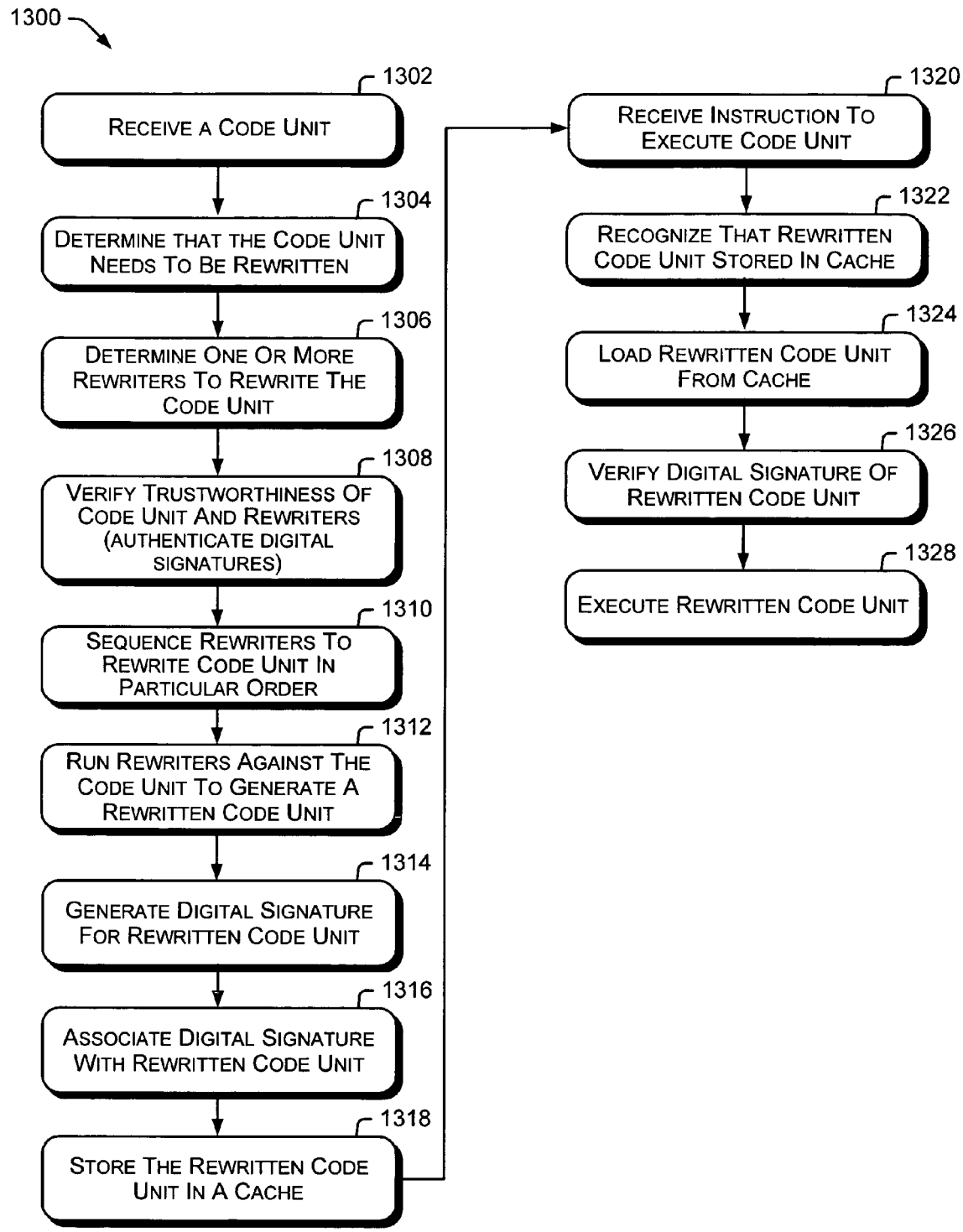
FIG. 13 illustrates a block diagram of an exemplary method for implementing code rewriting.

Example methods for implementing code rewriting will now be described with primary reference to the flow diagram of FIG. 13. The methods apply to the exemplary embodiments discussed above with respect to FIGS. 1-12. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another.

The elements of the described methods may be performed by any appropriate means including, for example, by hardware logic blocks on an ASIC or by the execution of computer-readable instructions defined on a computer-readable medium.

A "computer-readable medium," as used herein, can be any means that can contain, store, communicate, propagate, or transport instructions for use by or execution by a processor. A computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 1302 of method 1300, a code unit is received. The code unit is received by a rewrite manager that is either a stand alone module or a module within a component executing on a computer system (e.g., an operating system, a security policy, an application tool, etc.). At block 1304, the rewrite manager determines that the code unit needs to be rewritten. This determination can be made in various ways including, for example, by reading rewrite instructions (e.g., tags, attributes, strings, etc.) in the code unit itself which tell the rewrite manager that the code unit needs to be rewritten. At block 1306, the rewrite manager determines one or more rewriters that are to rewrite the code unit. The rewrite manager determines rewriters to rewrite the code unit by accessing a rewrite list that identifies the rewriters. The rewrite list may be instructions within the code unit itself, or it may be a file which is a stand-alone module on a computer system or which is a part of another component of the computer system. Alternatively, the rewrite list may be a file located on a remote computer device accessible via a network such as network 206.

After determining which rewriters are to rewrite the code unit, the rewrite manager accesses the identified rewriters from a group of one or more rewriters and loads them into memory (RAM) along with the code unit. Although rewriters have generally been discussed as being resident on the computer device on which they are executed, they may also be located on a remote computer device accessible via a network such as network 206. In this scenario, the rewrite manager would access the rewriters on the remote device and load them into RAM along with the code unit. The rewrite manager then verifies that the code unit and the rewriters are trustworthy as shown at block 1308. This is done by authenticating a digital signature associated with each of the code unit and rewriters. At block 1310, the rewrite manager sequences the rewriters in a particular order for execution against the code unit. There may only be one rewriter to apply to the code unit, in which case there would be no sequencing of rewriters. A sequence for more that one rewriter is determined according to the rewrite list. At block 1312, the rewrite manager executes the one or more rewriters against the code unit, one at a time, in the appropriate order. The execution of each rewriter against the code unit, modifies the code unit in a unique way. The result of the rewriting by the one or more rewriters is a rewritten code unit. At block 1314, a digital signature is generated for the rewritten code unit. The digital signature is associated with (e.g., attached to) the rewritten code unit as shown at block 1316. At block 1318, the rewritten code unit (and optionally, associated digital signature) is stored in a rewrite cache.

At block 1320, an instruction is received to execute the code unit. At block 1322, the rewrite manager recognizes that the rewritten code unit is stored in the rewrite cache. Therefore, the rewriting process does not have to be implemented again. Instead, the rewritten code unit is loaded directly from the rewrite cache at block 1326, and executed at block 1328.

While one or more methods have been disclosed by means of flow diagrams and text associated with the blocks of the flow diagrams, it is to be understood that the blocks do not necessarily have to be performed in the order in which they were presented, and that an alternative order(s) may result in similar advantages. Furthermore, the methods are not exclusive and can be performed alone or in combination with one another.

Exemplary Computer

Figure 14:
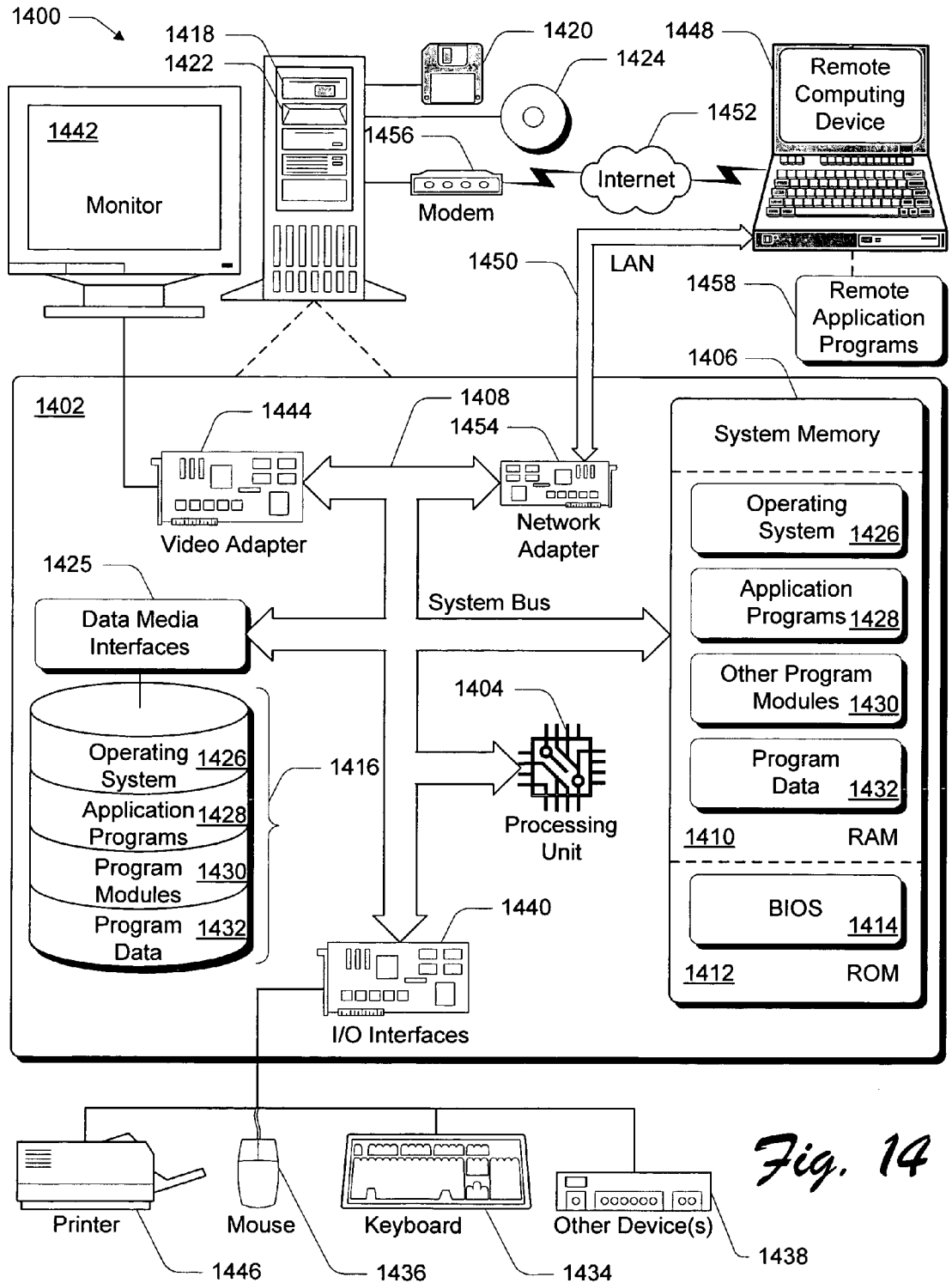
FIG. 14 illustrates an exemplary computing environment suitable for implementing a developer computer, an intermediate computer, and a deployment computer such as those shown in the exemplary environments of FIGS. 2 and 3.

FIG. 14 illustrates an exemplary computing environment suitable for implementing a developer computer 202, an intermediate computer 302, and a deployment computer 204 such as those discussed above with reference to FIGS. 1-13. Although one specific configuration is shown in FIG. 14, the developer computer 202, intermediate computer 302, and deployment computer 204 may be implemented in other computing configurations.

The computing environment 1400 includes a general-purpose computing system in the form of a computer 1402. The components of computer 1402 may include, but are not limited to, one or more processors or processing units 1404, a system memory 1406, and a system bus 1408 that couples various system components including the processor 1404 to the system memory 1406.

The system bus 1408 represents one or more of any of several types of bus structures, including a memory bus or memory controller, a peripheral bus, an accelerated graphics port, and a processor or local bus using any of a variety of bus architectures. An example of a system bus 1408 would be a Peripheral Component Interconnects (PCI) bus, also known as a Mezzanine bus.

Computer 1402 includes a variety of computer-readable media. Such media can be any available media that is accessible by computer 1402 and includes both volatile and non-volatile media, removable and non-removable media. The system memory 1406 includes computer readable media in the form of volatile memory, such as random access memory (RAM) 1410, and/or non-volatile memory, such as read only memory (ROM) 1412. A basic input/output system (BIOS) 1414, containing the basic routines that help to transfer information between elements within computer 1402, such as during start-up, is stored in ROM 1412. RAM 1410 contains data and/or program modules that are immediately accessible to and/or presently operated on by the processing unit 1404.

Computer 1402 may also include other removable/non-removable, volatile/non-volatile computer storage media. By way of example, FIG. 14 illustrates a hard disk drive 1416 for reading from and writing to a non-removable, non-volatile magnetic media (not shown), a magnetic disk drive 1418 for reading from and writing to a removable, non-volatile magnetic disk 1420 (e.g., a "floppy disk"), and an optical disk drive 1422 for reading from and/or writing to a removable, non-volatile optical disk 1424 such as a CD-ROM, DVD-ROM, or other optical media. The hard disk drive 1416, magnetic disk drive 1418, and optical disk drive 1422 are each connected to the system bus 1408 by one or more data media interfaces 1425. Alternatively, the hard disk drive 1416, magnetic disk drive 1418, and optical disk drive 1422 may be connected to the system bus 1408 by a SCSI interface (not shown).

The disk drives and their associated computer-readable media provide non-volatile storage of computer readable instructions, data structures, program modules, and other data for computer 1402. Although the example illustrates a hard disk 1416, a removable magnetic disk 1420, and a removable optical disk 1424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1416, magnetic disk 1420, optical disk 1424, ROM 1412, and/or RAM 1410, including by way of example, an operating system 1426, one or more application programs 1428, other program modules 1430, and program data 1432. Each of such operating system 1426, one or more application programs 1428, other program modules 1430, and program data 1432 (or some combination thereof) may include an embodiment of a caching scheme for user network access information.

Computer 1402 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1402 via input devices such as a keyboard 1434 and a pointing device 1436 (e.g., a "mouse"). Other input devices 1438 (not shown specifically) may include a microphone, joystick, game pad, satellite dish, serial port, scanner, and/or the like. These and other input devices are connected to the processing unit 1404 via input/output interfaces 1440 that are coupled to the system bus 1408, but may be connected by other interface and bus structures, such as a parallel port, game port, or a universal serial bus (USB).

A monitor 1442 or other type of display device may also be connected to the system bus 1408 via an interface, such as a video adapter 1444. In addition to the monitor 1442, other output peripheral devices may include components such as speakers (not shown) and a printer 1446 which can be connected to computer 1402 via the input/output interfaces 1440.

Computer 1402 may operate in a networked environment using logical connections to one or more remote computers, such as a remote computing device 1448. By way of example, the remote computing device 1448 can be a personal computer, portable computer, a server, a router, a network computer, a peer device or other common network node, and the like. The remote computing device 1448 is illustrated as a portable computer that may include many or all of the elements and features described herein relative to computer system 1402.

Logical connections between computer 1402 and the remote computer 1448 are depicted as a local area network (LAN) 1450 and a general wide area network (WAN) 1452. Such networking environments are commonplace in offices, enterprise-wide computer networks, intranets, and the Internet. When implemented in a LAN networking environment, the computer 1402 is connected to a local network 1450 via a network interface or adapter 1454. When implemented in a WAN networking environment, the computer 1402 includes a modem 1456 or other means for establishing communications over the wide network 1452. The modem 1456, which can be internal or external to computer 1402, can be connected to the system bus 1408 via the input/output interfaces 1440 or other appropriate mechanisms. It is to be appreciated that the illustrated network connections are exemplary and that other means of establishing communication link(s) between the computers 1402 and 1448 can be employed.

In a networked environment, such as that illustrated with computing environment 1400, program modules depicted relative to the computer 1402, or portions thereof, may be stored in a remote memory storage device. By way of example, remote application programs 1458 reside on a memory device of remote computer 1448. For purposes of illustration, application programs and other executable program components, such as the operating system, are illustrated herein as discrete blocks, although it is recognized that such programs and components reside at various times in different storage components of the computer system 1402, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer apparatus comprising a computing device and memory:

a code unit;

a composable set of rewriters, each rewriter configured to rewrite the code unit in a unique manner;

a rewrite manager configured to identify one or more rewriters from the composable set of rewriters, sequence the rewriters and to execute the identified one or more rewriters against the code unit, wherein the rewrite manager accessing a rewrite list that identifies which rewriter to apply to rewrite the code unit and provides the sequence the rewriters are applied to the code unit; and a rewritten code unit generated by executing the identified one or more rewriters against the code unit;

a first digital signature associated with the code unit; and a set of second digital signatures, each second digital signature associated with a specific rewriter from the composable set of rewriters;

wherein the rewrite manager is further configured to determine if the code unit is trusted based on the first digital signature, determine if each rewriter from the identified one or more rewriters is trusted based on a corresponding second digital signature from the set of second digital signatures, and execute the identified one or more rewriters against the code unit only if both the code unit and each rewriter from the identified one or more rewriters are trusted.

2. A computer apparatus as recited in claim 1, further comprising a rewrite cache, the rewrite manager further configured to store the rewritten code unit in the rewrite cache.

3. A computer apparatus as recited in claim 1, wherein the rewriter list is a component selected from a group comprising:
a list of rewriters in the code unit;
a list of rewriters in a stand-alone file;
a list of rewriters in a security policy; and
a list of rewriters in an installation tool.

4. A computer apparatus as recited in claim 1, further comprising a third digital signature associated by the rewrite manager with the rewritten code unit and configured to verify that the rewritten code unit is trusted.

5. A computer apparatus as recited in claim 1, wherein the rewrite manager is a component selected from a group comprising:
a stand-alone rewrite module;
a rewrite module configured as part of an operating system;
a rewrite module configured as part of an installation tool; and
a rewrite module configured as part of a security policy.

6. A computer apparatus as recited in claim 1, selected from a group comprising:
a development computer configured to develop the code unit;
an intermediate computer configured to install the code unit; and
a deployment computer configured to execute the code unit.

7. A method comprising:
receiving a code unit;
determining that the code unit is to be rewritten by a rewriter, wherein the rewriter is determined by a rewrite manager that accesses a rewrite list that identified which rewriter to apply to rewrite the code unit and provides a the sequence the rewriters are applied to the code unit;
determining if the code unit and the rewriter are trusted;
running the rewriter against the code unit to generate a rewritten code unit if the code unit and the rewriter are trusted;
generating a first digital signature associated with the code unit;
generating a set of second digital signatures, each second digital signature associated with a specific rewriter from the rewrite list, wherein the rewrite manager is fUrther configured to determine if the code unit is trusted based on the first digital signature, determine if each rewriter from the identified one or more rewriter is trusted based on a corresponding second digital signature from the set of second digital signatures, and execute the identified one or more rewriters against the code unit only if both the code unit and each rewriter from the identified one or more rewriters are trusted;
attaching the first digital signature to the rewritten code unit; and
storing the rewritten code unit in a cache.

8. A method as recited in claim 7, further comprising:
receiving a call to execute the code unit;
recognizing that the code unit has been rewritten;
loading the rewritten code unit from the cache;
verifying the digital signature attached to the rewritten code unit; and
executing the rewritten code unit if the verifying indicates that the rewritten code unit is secure.

9. A method as recited in claim 7, wherein the rewriter is an application compatibility rewriter and the determining that the code unit is to be rewritten comprises:
identifying the code unit as an application; and
consulting an application compatibility rewrite database to determine if any part of the application needs to be rewritten for compatibility with a current execution environment.

* * * * *